UNITED STATES PATENT OFFICE.

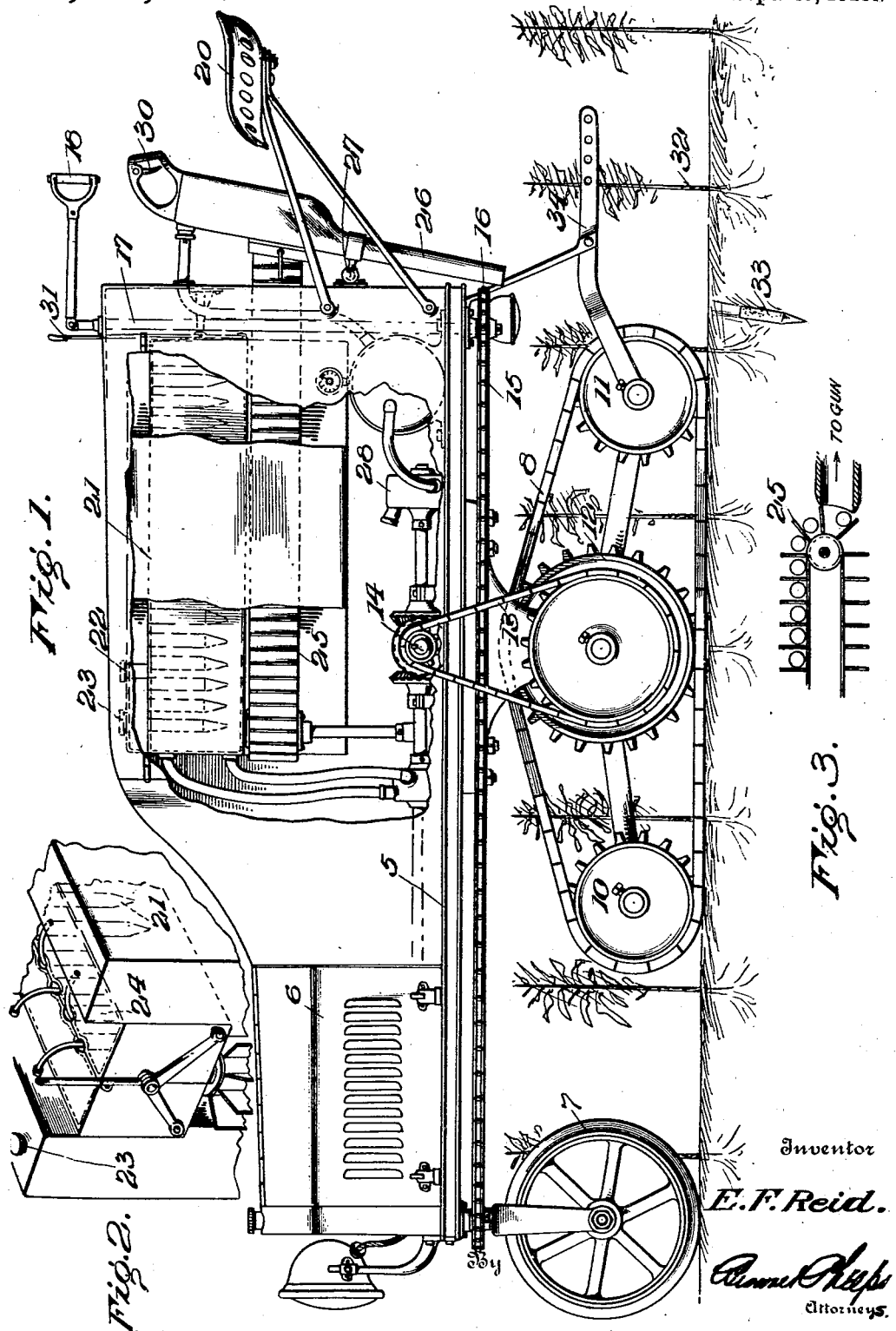

ELTON F. REID, OF WACO, TEXAS.

METHOD OF IRRIGATING PLANTS.

1,278,216.    Specification of Letters Patent.    Patented Sept. 10, 1918.

Application filed June 8, 1918. Serial No. 238,862.

*To all whom it may concern:*

Be it known that I, ELTON F. REID, a citizen of the United States, residing at Waco, in the county of McLennan and State of Texas, have invented certain new and useful Improvements in Methods of Irrigating Plants, of which the following is a specification.

This invention relates to a process or method of irrigating plants, trees, shrubs or the like.

One of the objects of the present invention is to provide a simple and practicable process adapted to convey irrigating means in the form of a solid to a point adjacent the roots of the plants whereby the moisture will be most readily taken up. A further object is to provide a method of the above general character particularly adapted for irrigating plants in hot dry climates.

The invention accordingly consists in such steps and the relation of each step to each of the other steps as will be hereinafter more fully pointed out in the following description and as set forth in the appended claims.

Figure 1 is a side elevation partly in section showing largely diagrammatically the complete apparatus;

Figs. 2 and 3 are detail views.

Referring now to the drawings in detail and more particularly to Fig. 1, 5 denotes the floor of the body portion of a vehicle of any desired type, but as herein shown, the apparatus comprises a self-contained automobile tractor, preferably of tractor form having an engine indicated at 6, one or more steering wheels 7 at the forward part and a tractor chain 8 in the rear. This chain 8 is adapted to travel about the sprockets 10 and 11 driven by a central sprocket 12 which in turn is rotated by means of chain 13 operated from a main transverse drive shaft 14. This, of course, is connected in any desired manner with the main engine 6 and includes suitable transmission, change speed, and engine control, as may be necessary. The front or steering wheels 7 are connected in any suitable manner as by means of rope or chain 15 to a rear wheel 16 at the bottom of shaft 17 the upper end of which shaft is provided with a steering handle 18. The driver's or operator's seat 20 is conveniently located at the rear of the machine, as indicated.

Mounted in the upper rear part of the body of the vehicle is a two-part chamber 21 adapted to hold or contain a freezing mixture such as a brine or gas of any desired type and if of that character requiring compression, a pump is preferably provided driven from or adapted to be connected with the main source of power 6, as may be necessary. As the particular type of refrigerant and method of use forms no special part of the invention, details of such apparatus are for clearness omitted, it being sufficient to indicate an inlet 22 to this tank.

Adjacent this tank 21 either above or surrounding it as may be desired for insulating purposes, is a second tank, having an inlet 23 for supplying water at intervals to a series of split molds 24 (Fig. 2) operatively associated with the refrigerator tank; fertilizer may be mixed with the water, if desired. These molds are of general cylindrical shape having pointed ends and after the water has been frozen therein they may be separated along longitudinal lines, as indicated for example, in Fig. 2, to discharge the pellet or projectile of ice into an endless conveyer belt 25 positioned therebeneath. This conveyer belt is adapted to convey the ice projectiles to one or more discharging devices 26 indicated by a gun mounted in pivotal bearings 27 whereby its direction may be varied at will. This gun is preferably operated by compressed air obtained from air pump shown diagrammatically at 28 and connected in any desired manner with the main source of motive supply 6. A trigger 30 is associated with the gun for discharging it as desired while a second trigger 31 is positioned convenient to the operator for actuating the endless belt 25 in the step by step manner to feed the projectile to the gun 26.

As shown in Fig. 1, plants are indicated at 32 and the gun is shown as discharging a projectile 33 into the ground adjacent the roots of the plants. In this manner the ice is protected from the direct rays of the sun as well as the dry atmosphere by the layer of dirt thereover and will slowly melt allowing the roots of the plants to absorb the full extent of moisture. If desired, an attachment 34 may be connected with the rear of the machine for covering over the hole in the ground made by the entering projectile thereby to more efficiently conserve the moisture.

In operation, the machine travels along between or straddles the rows of plants under its own power and as the plants are reached the gun 26 is fired to discharge a projectile into the ground at the roots of the plant, as shown. The apparatus is of such size as to provide twenty or thirty projectiles at once to the endless belt 25 and while these are being used, a second charge will have been made by the refrigerant in the freezing tank.

The method of using the apparatus herein described consists primarily in freezing a liquid preferably water and discharging the solidified liquid into the ground adjacent the roots of the plant to be irrigated and then covering the opening in the ground through which the projectile passed, thereby to prevent too rapid melting of the ice and evaporation of the liquid formed, thus enabling the plant to utilize to the fullest extent the irrigating developed in this way.

The invention is of simple and practical character and is adapted to accomplish, among others, all of the objects and advantages herein set forth.

Without further analysis, the foregoing will so fully reveal the gist of this invention that others can by applying current knowledge readily adapt it for various applications without omitting certain features that, from the standpoint of the prior art, fairly constitute essential characteristics of the generic or specific aspects of this invention, and therefore such adaptations should and are intended to be comprehended within the meaning and range of equivalency of the following claims.

I claim:

1. The herein described method of irrigating which consists in freezing the irrigating fluid and driving the fluid in its solidified form into the ground adjacent the roots of the plant to be irrigated.

2. The herein described method of irrigating which consists in freezing the irrigating fluid and driving the fluid in its solidified form into the ground adjacent the roots of the plant to be irrigated, and then sealing over the opening made in the ground by the projectile.

3. The herein described method of irrigating plants which consists in freezing an irrigating fluid into a plurality of projectiles or pellets, feeding said projectiles to a firing device, firing the projectiles into the ground adjacent the roots of the plants to be irrigated.

4. The herein described method of irrigating plants which consists in freezing an irrigating fluid into a plurality of projectiles or pellets, feeding said projectiles to a firing device, firing the projectiles into the ground adjacent the roots of the plants to be irrigated, and covering over the hole formed in the ground by the entering projectile, thereby to prevent excessive external evaporation.

In testimony whereof I affix my signature in presence of two witnesses.

ELTON F. REID.

Witnesses:
D. W. GALL,
K. E. KLEIN.